US012434961B2

(12) United States Patent
Van Lierop

(10) Patent No.: US 12,434,961 B2
(45) Date of Patent: Oct. 7, 2025

(54) SCANNING MEMS MIRROR DEVICE

(71) Applicant: VLC Holding B.V., Weert (NL)

(72) Inventor: Hendrikus Wilhelmus Leonardus Antonius Maria Van Lierop, Weert (NL)

(73) Assignee: VLC HOLDING B.V., Weert (NL)

( * ) Notice: Subject to any disclaimer, the term of this patent is extended or adjusted under 35 U.S.C. 154(b) by 429 days.

(21) Appl. No.: 18/014,365

(22) PCT Filed: Jul. 6, 2021

(86) PCT No.: PCT/NL2021/050430
§ 371 (c)(1),
(2) Date: Jan. 4, 2023

(87) PCT Pub. No.: WO2022/010349
PCT Pub. Date: Jan. 13, 2022

(65) Prior Publication Data
US 2023/0257255 A1    Aug. 17, 2023

(30) Foreign Application Priority Data
Jul. 7, 2020 (EP) .................................... 20184532

(51) Int. Cl.
G02B 26/08 (2006.01)
B81B 3/00 (2006.01)

(52) U.S. Cl.
CPC ........ *B81B 3/0045* (2013.01); *G02B 26/0833* (2013.01); *B81B 2201/033* (2013.01);
(Continued)

(58) Field of Classification Search
CPC ............ B81B 3/0045; B81B 2201/033; B81B 2201/034; B81B 2201/042;
(Continued)

(56) References Cited

U.S. PATENT DOCUMENTS 4,317,611 A    3/1982 Petersen
9,588,337 B2   3/2017 Van Lierop et al.
(Continued)

FOREIGN PATENT DOCUMENTS

JP    2003-057575 A    2/2003
WO    2009/044331 A2   4/2009

OTHER PUBLICATIONS

International Search Report dated Oct. 6, 2021, issued in corresponding International Patent Application No. PCT/NL2021/050430, 2 pgs.
(Continued)

Primary Examiner — Euncha P Cherry
(74) Attorney, Agent, or Firm — Pillsbury Winthrop Shaw Pittman, LLP

(57) ABSTRACT

The improved scanning MEMS mirror device disclosed herein comprises a mirror body that is rotatable around a rotation axis with respect to a stationary body, wherein a rotation of the mirror body is flexibly restrained with at least one coupling element that biases the mirror body towards a neutral state. The coupling element comprises at least a bridge section and a first leaf spring section and a second leaf spring section. The first leaf spring section extends in an extension direction from a first end thereof at the bridge section towards a second end thereof that is connected to the mirror body. The second leaf spring section extends in an extension direction from a first end thereof at the bridge section towards a second end thereof where it is connected to the stationary body. The extension direction of the first leaf spring section and the extension direction of the second leaf spring section are at least substantially the same as the second planar direction. The leaf spring sections have a thickness defined in a direction orthogonal to the reference plane that is smaller than their width, defined in said first planar direction. The construction of the improved scanning
(Continued)

MEMS mirror device results in an increased eigenfrequency of undesirable eigenmodes.

20 Claims, 11 Drawing Sheets

(52) U.S. Cl.
CPC ... *B81B 2201/034* (2013.01); *B81B 2201/042* (2013.01); *B81B 2203/0109* (2013.01); *B81B 2203/0163* (2013.01); *B81B 2203/056* (2013.01); *B81B 2207/11* (2013.01)

(58) Field of Classification Search
CPC .... B81B 2203/0109; B81B 2203/0163; B81B 2203/056; B81B 2207/11; B81B 2201/032; B81B 2203/058; G02B 26/0833; G02B 26/0841
See application file for complete search history.

(56) References Cited

U.S. PATENT DOCUMENTS

| | | |
|---|---|---|
| 2005/0045727 A1 | 3/2005 | Fu |
| 2007/0242342 A1 | 10/2007 | Fu |
| 2010/0296146 A1 | 11/2010 | Krastev et al. |
| 2014/0300942 A1 | 10/2014 | Van Lierop et al. |
| 2015/0036203 A1 | 2/2015 | Nitsche et al. |
| 2019/0361223 A1 | 11/2019 | Albert et al. |
| 2020/0310110 A1* | 10/2020 | Carminati .......... G02B 26/0858 |
| 2021/0396990 A1 | 12/2021 | Bella |

OTHER PUBLICATIONS

Written Opinion of the International Searching Authority dated Oct. 6, 2021, issued in corresponding International Patent Application No. PCT/NL2021/050430, 6 pgs.

Extended European Search Report mailed Jun. 28, 2022, issued in European Patent Application No. 22151034.0 (6 pgs.)

\* cited by examiner

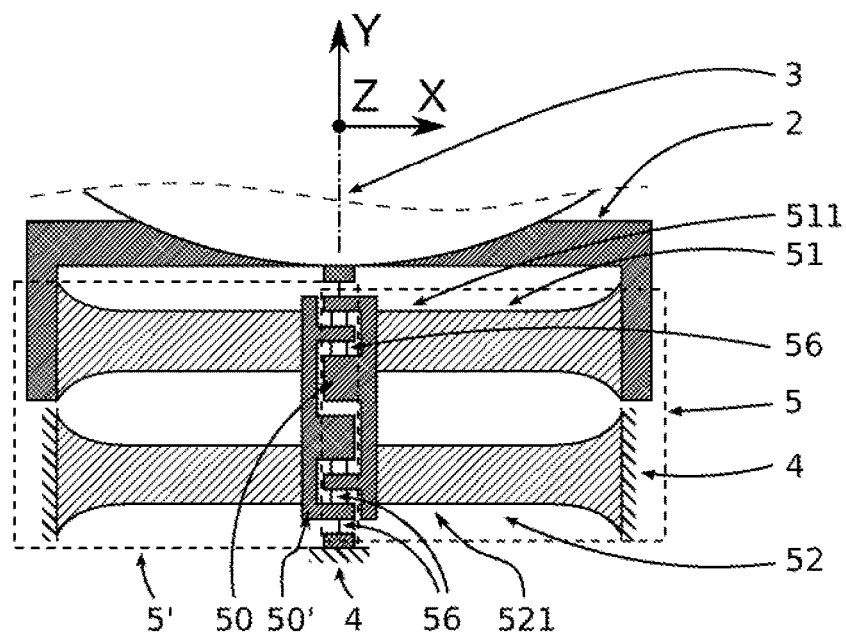
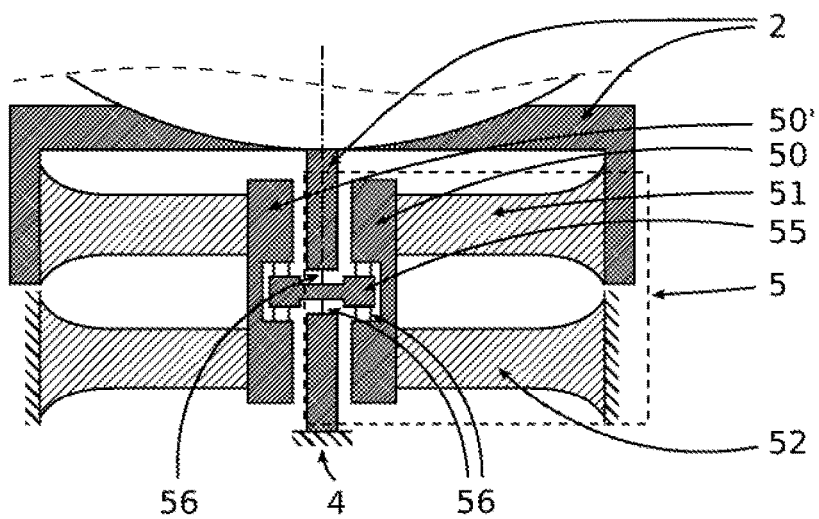
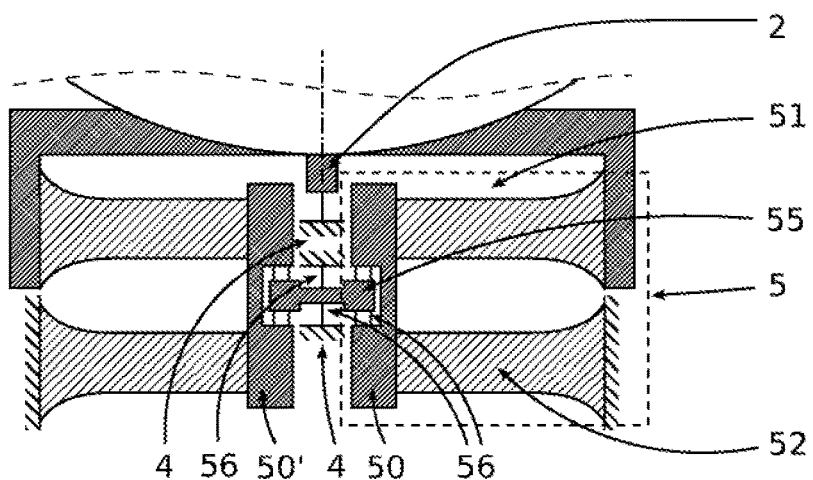

▨ thick, rigid   ▨ thin, flexible   ≈≈≈ pole or frame, stationary

▨ thick, rigid    ▨ thin, flexible    ⋙ pole or frame, stationary

▨ thick, rigid      ▨ thin, flexible      ⧨ pole or frame, stationary

SCANNING MEMS MIRROR DEVICE

CROSS-REFERENCE TO RELATED APPLICATIONS

This is the U.S. National Stage of PCT/NL2021/050430, filed Jul. 6, 2021, which claims priority to European Patent Application No. 20184532.8, filed Jul. 7, 2020, and all contents of each of these applications are incorporated herein by reference in their entireties.

FIELD OF THE INVENTION

The present invention pertains to a scanning MEMS (Micro Electro Mechanical Systems) mirror device.

BACKGROUND OF THE INVENTION

MEMS scanning mirrors are being used in many different applications, including medical diagnostics, projection of video, laser printing, and light detection and ranging (LIDAR). They are being used to steer visible or invisible light into different directions, for example to address multiple points along a line, to illuminate a 2D surface, or to scan a 3D volume. The MEMS scanning mirror may comprise at least one rotation axis.

LIDAR is used in automotive applications to scan the environment of a vehicle, in order to detect the presence of objects and to measure the distance to those objects. A MEMS scanning mirror is used therein to direct a laser pulse or beam via its mirror surface towards the object, and it may also be used to collect the laser pulse or beam reflected by the object and to direct it via its mirror surface to a detector. Generally, MEMS scanning mirrors for automotive LIDAR applications may need to be relatively large, relative fast, and may need to allow for a relatively large scan angle. For example, desired specifications of such a MEMS scanning mirror are a mirror diameter in a range of 2 to 10 mm, an oscillation frequency in the range of 500 Hz to 20 kHz, and a mechanical scanning angle in a range from ±10 to ±30 degrees. At the same time, the MEMS mirror must be robust enough to withstand vibrations, shocks, high and low temperatures, and have a long lifetime. This may be achieved by designing the MEMS scanning mirror such that its mirror body has a low rotational inertia and a high stiffness, such that the mirror suspension has a very high stiffness in all degrees-of-freedom (DOF) other than the DOF used for the scanning, and such that the mechanical stresses in flexible suspension members, such as leaf springs, relief springs and vertical support beams are low. The MEMS scanning mirror may also have a high stiffness for the DOF corresponding to rotation around a rotation axis, in which case it may be desirable to operate the MEMS scanning mirror in resonance.

Leaf springs may be used to accurately define the stiffness and resonance frequency corresponding to for example a rotation Ry around a desired rotation axis (herein denoted as Y-axis), while suppressing other undesirable motions, such as for example the rotation Rz around the Z-axis (perpendicular to the mirror surface), and such as translations Tx in the X-direction, i.e. in a plane defined by the mirror surface transverse to the desired rotation axis. These motions can be suppressed by a high translational stiffness in the corresponding direction, or a high rotational stiffness around the corresponding axis. They can also be suppressed by a low inertia of the corresponding motion. Combining a high stiffness with a low inertia for any of these motions will lead to a high resonance frequency of such motion. Such motions occurring at resonance frequencies are called eigenmodes, and the corresponding resonance frequencies are called eigenfrequencies. Ideally, the eigenfrequencies of the undesirable eigenmodes are substantially higher than the eigenfrequency of the desirable mode.

Examples of a MEMS scanning mirror using leaf springs are disclosed in WO2009044331A2 and U.S. Pat. No. 9,588,337B2. In these examples the in-plane rotation mode Rz is effectively suppressed, as well as the out-of-plane rotation mode Rx. This is however not the case for the in-plane translation mode Tx, due to the usage of relief springs at one of the ends of the leaf springs. These relief springs are used to mitigate or tailor the stiffening behavior of the leaf springs at larger tilt angles. This stiffening is caused by tensile stresses in the leaf spring, which increase with tilt angle, and which are again caused by the elongation of the leaf spring in the X-direction. Stiffening of the leaf springs introduces non-linear effects in the dynamics and control of the MEMS mirror. This makes the device more fragile due to mode coupling phenomena. Additionally, stiffening leads to high mechanical stresses, which limits the achievable tilt angle. This is partly mitigated by using relief springs as disclosed for example in the two publications listed above However, introducing such relief springs reduces the translational stiffness in the X-direction (perpendicular to the rotation axis), and hence reduces the eigenfrequency of the translational eigenmode Tx. This makes the MEMS mirror more sensitive to vibration in that direction. In the embodiments as disclosed in the two publications listed above, the Tx mode typically has the lowest eigenfrequency of all the undesirable motions.

SUMMARY OF THE INVENTION

It is an object of the present invention to provide an improved scanning MEMS mirror device having a construction providing for an increased eigenfrequency of the Tx mode and of other undesirable eigenmodes.

In order to achieve this object, the improved scanning MEMS mirror device comprises a mirror body that is rotatable around a rotation axis with respect to a stationary body, wherein a rotation of the mirror body is flexibly restrained with at least one coupling element that biases the mirror body towards a neutral state wherein a mirror surface of the mirror body is parallel with a reference plane with a first planar direction defined by the rotation axis and a second planar direction orthogonal thereto. The mirror surface with the mirror in the neutral state does not necessarily coincide with the reference plane. Typically, the rotation axis, and therewith the reference plane is below the mirror surface. In this connection it is noted that "above" the mirror surface is defined as in a direction faced to by the mirror surface and "below" the mirror surface is in the opposite direction. In this application, the first planar direction will also be denoted as Y-direction, and the second planar direction will also be denoted as X-direction. In its neutral state the mirror surface faces in the direction Z. Accordingly this direction is also denoted as facing direction or Z-direction. It is further noted that the mirror surface does not need to entirely extend over the mirror body. The mirror body may have portions extending outside a central portion provided with the mirror surface. Such extending mirror body portions are for example used for connection of the mirror body to the coupling element(s). Such extending mirror body portions for example extend along the rotation axis or transverse thereto. Accordingly, the mirror body is the rigid body formed by the central portion provided with the mirror surface and any such extension portions.

The coupling element comprises at least a bridge section and a first leaf spring section and a second leaf spring section. The first leaf spring section extends in an extension direction from a first end thereof at the bridge section towards a second end thereof that is connected to the mirror body. The second leaf spring section extends in an extension direction from a first end thereof at the bridge section towards a second end thereof where it is connected to the stationary body. The extension direction of the first leaf spring section and the extension direction of the second leaf spring section are at least substantially the same as the second planar direction. That is to say, a direction of their centerlines deviates at most 30 degrees from the second planar direction.

The first and the second leaf spring section have a thickness defined in a direction orthogonal to the reference plane and have a width defined in the first planar direction, such that the thickness is smaller than the width. The first and the second leaf spring section each preferably have a length in the second planar direction that is larger than a length of the bridge section in the first planar direction. In case the coupling element comprises more than two leaf spring sections their length is preferably larger than the distance between the centerlines of two neighboring leaf spring sections. Therewith a stiff connection between the leaf spring sections is achieved, which results in a sufficiently high stiffness of the Ry mode for operation at resonance. Additionally, the rotation of the bridge section around the X-axis is limited, which limits the twisting of the leaf spring sections By using a coupling element with a first and a second leaf spring sections, which are geometrically parallel (but in series from a mechanical point-of-view), the stiffness in the X-direction can be greatly enhanced as compared to the known scanning MEMS mirror device, provided with relief springs. This increases the eigenfrequency of the undesirable Tx and Rz modes, which reduces the sensitivity to vibrations in that direction. Typically, the stiffness of the suspension in the X-direction is 2× to 10× larger than in an embodiment using relief springs.

Upon bending, the leaf spring sections will contract with the same amount, and in the same direction (positive or negative X-direction). The leaf spring sections are therefore free to contract. This prevents the tensile stresses that would otherwise occur at large tilt angles. Therewith relief springs are obviated. Therewith the improved scanning MEMS mirror device provides an increased stiffness in the X-direction, a reduced stiffening in the Ry mode, and a reduced non-linearity in the Ry mode.

Some embodiments of the improved scanning MEMS-mirror device further comprise a vertical support beam unit that extends at least substantially along the rotation axis. The vertical support beam unit is connected at a first end thereof to the mirror body and is connected at a second end thereof to the stationary body. The vertical support beam unit has one or more vertical support beam elements. The one or more vertical support beam elements provide for a relatively low stiffness for rotations around the rotation axis, for translation in the X-direction, and for rotation around the Z-axis. They provide a relatively high stiffness for other degrees of freedom, most importantly for the translation in Z-direction. A vertical support beam unit may be provided along the rotation axis between an extension portion of the mirror body and a portion of the stationary body. In an embodiment the vertical support beam unit comprises a rigid intermediate element with a first vertical support beam element that couples the rigid intermediate element to the mirror body and a second vertical support beam element that couples the rigid intermediate element to the stationary body.

In some embodiments of the improved scanning MEMS-mirror device, the stationary body has a stationary layer arranged below the mirror surface. I.e. the stationary layer is present at a side of the mirror surface in a direction opposite to the facing direction of the mirror surface. In that embodiment, the stationary layer has a pole facing upwards, i.e. in the facing direction of the mirror surface, to which the second end of the second leaf spring section is connected, or to which one or more vertical support beams are connected. Accordingly, with the mirror surface facing upwards these embodiments of the scanning MEMS mirror device have at least two layers, wherein the mirror body is formed in at least the upper one of these layers and the stationary body is formed in at least the lower one of these layers. Nevertheless, the mirror body may also be partly formed in the lower layer, for example the mirror body may have reinforcement beams at a rear surface opposite the mirror surface formed in the lower layer and the stationary body may be partly formed in the higher layer. For example, the pole may be formed therein.

In some embodiments of the improved scanning MEMS-mirror device the second end of the first leaf spring is spatially closer to the rotation axis than its first end. In other embodiments, the first end of the first leaf spring is spatially closer to the rotation axis than its second end.

In some embodiments of the improved scanning MEMS-mirror device, a distance between the first end of the first leaf spring and the rotation axis is substantially the same as a distance between the first end of the second leaf spring and the rotation axis, and a distance between the second end of the first leaf spring and the rotation axis is substantially the same as a distance between the second end of the second leaf spring and the rotation axis.

In some embodiments of the improved scanning MEMS-mirror device the first and the second leaf spring are two of a larger plurality of leaf springs of said at least one coupling element, the leaf springs of said larger plurality each extending in an extension direction from a first end thereof at the bridge section towards a second end thereof at either the mirror body or the stationary body. In these embodiments the leaf springs of the larger plurality of leaf springs are arranged side by side in a direction parallel to the first planar direction. A total width of leaf springs of said larger plurality coupled at their second end to the mirror body may be at least substantially equal to a total width of leaf springs of said larger plurality coupled at their second end to the stationary body. Also, in the first planar direction, leaf springs connected to the mirror body may be alternated by leaf springs connected to the stationary body.

In these embodiments, a net torque (around the X-axis) on the bridge section is substantially reduced. I.e. in operation the rotation of the bridge section around the X-axis will be substantially reduced, and therefore the leaf springs will be less subject to twisting. Therewith a more purely bending of the leaf spring is remaining, and the mechanical stress is more uniform and substantially reduced.

In a practical example of these embodiments, the larger plurality of leaf spring sections comprises a third leaf spring section and a width of a centrally arranged one of the first, the second and the third leaf spring section is equal to the sum of the widths of the other two of said leaf spring sections.

In some embodiments of the improved scanning MEMS-mirror device the bridge section and the leaf spring sections are integrally formed of a plate of material.

In other embodiments, the bridge section has a thickness that is larger than the thickness of the leaf spring sections. Therewith a deformation of the bridge section during operation is reduced, which results in a more uniform mechanical loading of leaf spring sections at their first ends.

In some embodiments the coupling element maybe only coupled to the mirror body and the stationary body by its leaf spring sections. In these embodiments a rotation of the bridge section around an axis in the second planar direction may occur in case of an asymmetric loading of the bridge section. In operation this leads to twisting of the leaf spring sections. Additionally, the coupling element has an eigenmode, as the bridge section can move in the Z-direction (i.e. in a direction orthogonal to the reference plane). The frequency of this eigenmode will be reduced when increasing the thickness (and hence mass) of the freely moving bridge section. An asymmetric loading is avoided or mitigated in the embodiments referred to above wherein the first and the second leaf spring section are two of a larger plurality of leaf spring sections of the at least one coupling element. However, an asymmetric loading exists for example in the case where the bridge section only has one leaf spring section coupled to the mirror body and one leaf spring section coupled to the stationary body. Also in that case twisting of the leaf spring sections can be avoided in embodiments of the improved scanning MEMS-mirror device wherein the bridge section of the at least one coupling element is flexibly coupled to one of the mirror body, the stationary body, or another bridge element. In some examples thereof, the flexible coupling is an elastic connection, e.g. using one or more resilient elements such as vertical support beams. This is most easily achieved in the embodiments in which the bridge section is located close to the rotation axis, as there will be only a minor translation of the bridge section in the Z-direction upon rotation of the mirror body. The bridge section may be flexibly coupled to the stationary body and/or to the mirror body by one or more resilient elements. The resilient elements should preferably not substantially constrain translations of the bridge section in the second planar direction (i.e. the resilient elements should have a low stiffness in X-direction), such that they can contract freely upon bending. Otherwise the amount of stiffening will increase, leading to the non-linear effects and increase of mechanical stresses described earlier. The vertical support beams should have a relatively high stiffness in the Z-direction to suppress the rotation of the bridge section around the X-axis. According to another approach the bridge section of the at least one coupling element is flexibly coupled, optionally by an elastic connection, to a bridge section of another coupling element. In exemplary embodiments of this other approach, the bridge element of the at least one coupling element is flexibly coupled to the bridge element of the another coupling element via an intermediate rigid element. The flexible coupling, for example using vertical support beams, allows the bridge sections to move in X-direction (to prevent introducing stiffening), while still constraining some of their other DOFs such as rotation around the X-axis. In these exemplary embodiments, the rotation of the bridge sections around the X-axis is prevented by the intermediate body and by the vertical support beams, which reduces the twisting of the leaf spring sections, and hence reduces the mechanical stresses therein. In another exemplary embodiment, the bridge section of the at least one coupling element is flexibly coupled, optionally by an elastic connection, to a bridge section of another coupling element without using an intermediate body. In this exemplary embodiment, the rotation of the bridge sections around the X-axis is prevented by the vertical support beams. It is noted that the rotation of the intermediate rigid element and the bridge sections around the Y-axis is half of the rotation of the mirror body. In specific examples of these exemplary embodiments of the above-mentioned other approach, the intermediate rigid element is rotatably coupled to the mirror body and/or to the stationary body by vertical support beam elements. In those examples wherein the first ends of the leaf spring sections with the bridge section are closer to the rotation axis than their second ends it is possible to use the coupling between the bridge sections, optionally using an intermediate rigid element, to suppress the eigenmode of the leaf spring sections too (in addition to preventing only the rotation of the bridge sections and first ends around the X-axis). Preferably, multiple vertical support beams are used to connect the opposing bridge sections, optionally using an intermediate rigid body.

BRIEF DESCRIPTION OF THE DRAWINGS

These and other aspects of the invention are described in more detail with reference to the drawings. Therein:

FIGS. 7A-7C schematically show various embodiments of the MEMS mirror as claimed, in which the bridge sections of two coupling elements are connected to each other by an elastic connection, optionally using a rigid intermediate body;

DETAILED DESCRIPTION

Figure 1A:
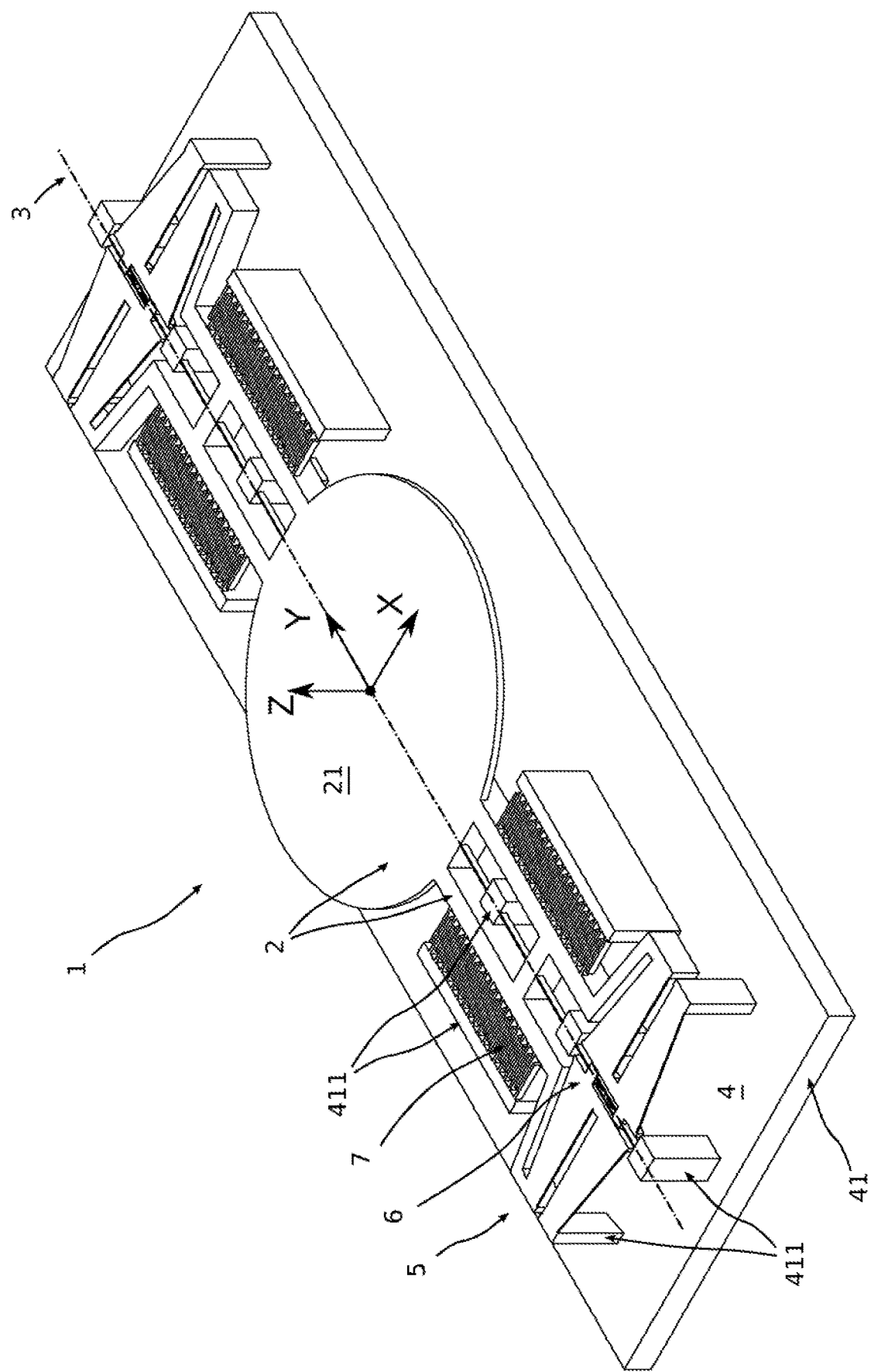
FIG. 1A is a perspective view schematically showing an embodiment of the MEMS mirror as claimed, in its neutral state.

FIG. 1A is a perspective view schematically showing an embodiment of the MEMS mirror device 1 as claimed, in its neutral state. The MEMS mirror device comprises a mirror surface 21, supported by a mirror body 2. The mirror surface 21 can be the top surface of the mirror body 2, and therefore consist of the same material as the mirror body 2. Alternatively, the mirror surface can be the top surface of an additional layer of the same material or of a different material deposited or bonded on top of the mirror body 2. For example, a thin layer of reflective material such as gold or aluminum may form the mirror surface 21. Additionally, the MEMS mirror comprises at least one coupling element 5 that biases the mirror body 2 towards the neutral state, and at least one vertical support beam unit 6 that enables the mirror body 2 to rotate around a rotation axis 3. The coupling element 5 and the vertical support beam element 6 are coupled to the mirror body 2 as well as to the stationary body 4. The coupling element 5 is coupled such that it can apply a torque between the stationary body 4 and the mirror body 2, around the rotation axis 3. In the embodiment of FIG. 1A, the stationary body 4 is a stationary layer 41 located underneath the mirror body 2, and the coupling to the stationary body is realized using poles 411. The poles can be used to establish a connection, using elastic elements such as leaf spring sections 51 or 52 or vertical support beams 56, between the mirror body 2 and the stationary body 4 in locations in the MEMS mirror device 1 where no stationary frame is available or easily accessible. In alternative embodiments, the stationary body 4 is a frame surrounding the mirror body, in which poles may be absent. The frame may be at least partly situated in the same layer as the mirror body. In another embodiment, the stationary body 4 comprises a stationary layer as well as a frame. Finally, the MEMS mirror device 1 may comprise an actuator 7, for example an electrostatic comb drive actuator. In the embodiment depicted in FIG. 1A, the actuator 7 is located in between the MEMS mirror surface 21 and the coupling element 5. In other embodiments, the actuator may be located underneath the mirror body 2 or mirror surface 21, or the coupling element 5 may be located in between the actuator 7 and the mirror surface 21. In yet other embodiments, the actuator may be an electromagnetic actuator or piezoelectric actuator.

Figure 1B:
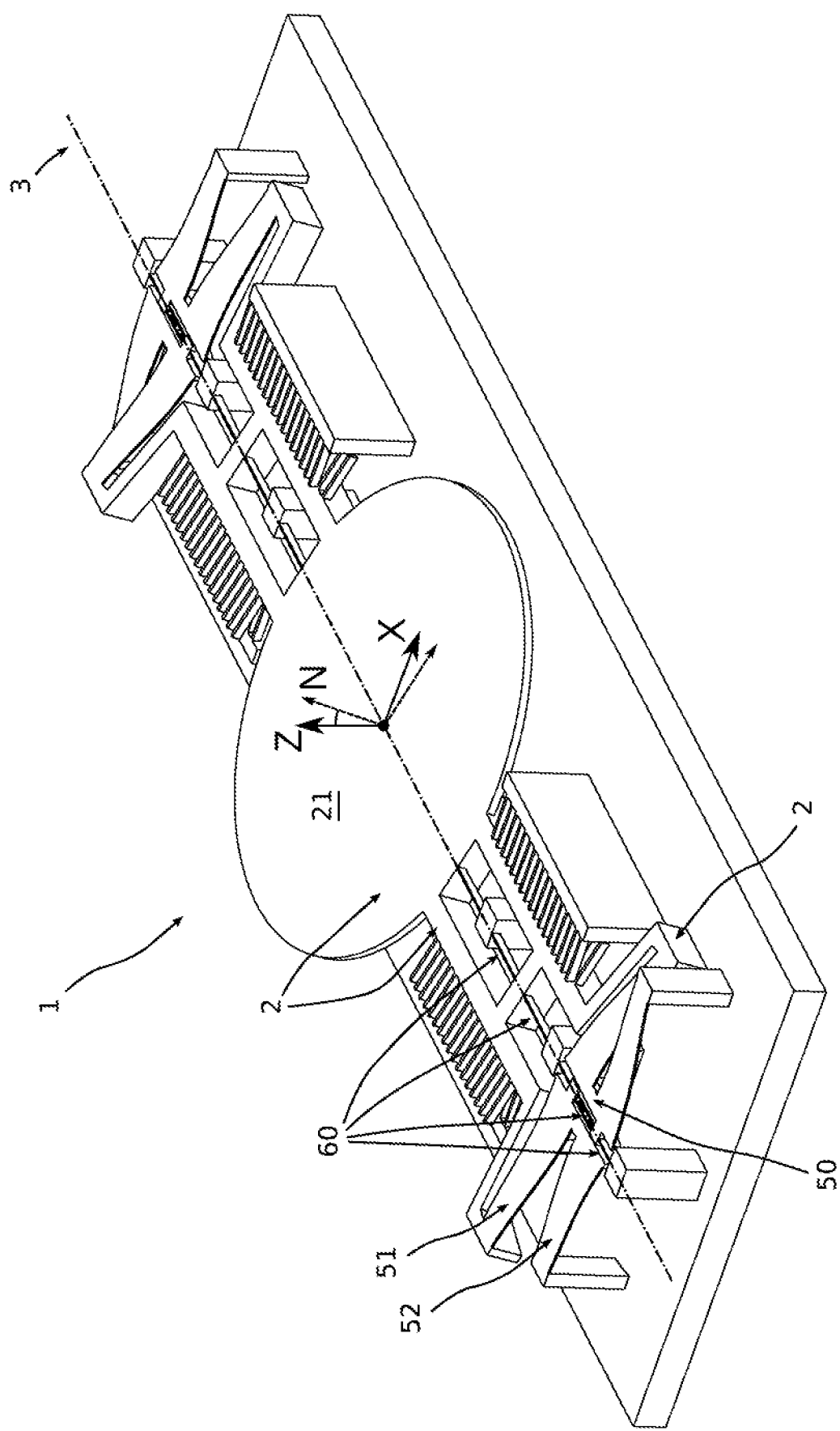
FIG. 1B is a perspective view schematically showing an embodiment of the MEMS mirror as claimed, in a deflected state: it shows a mirror body that has been rotated over a large tilt angle, and leaf springs and vertical support beams that are deformed.

FIG. 1B is a perspective view schematically showing an embodiment of the MEMS mirror device 1 as claimed, but now in a deflected state. It shows a mirror body 2 that has been rotated over a large tilt angle, and leaf spring sections 51, 52 and vertical support beam elements 60 that are deformed. The predominant deformation of the leaf spring sections 51, 52 is bending, whereas the predominant deformation of the vertical support beam elements is twisting. FIG. 1B illustrates that the normal N of the mirror surface 21 has rotated over an angle around the rotation axis 3. The rotation axis 3 is parallel or colinear to the Y-axis.

Figure 2:
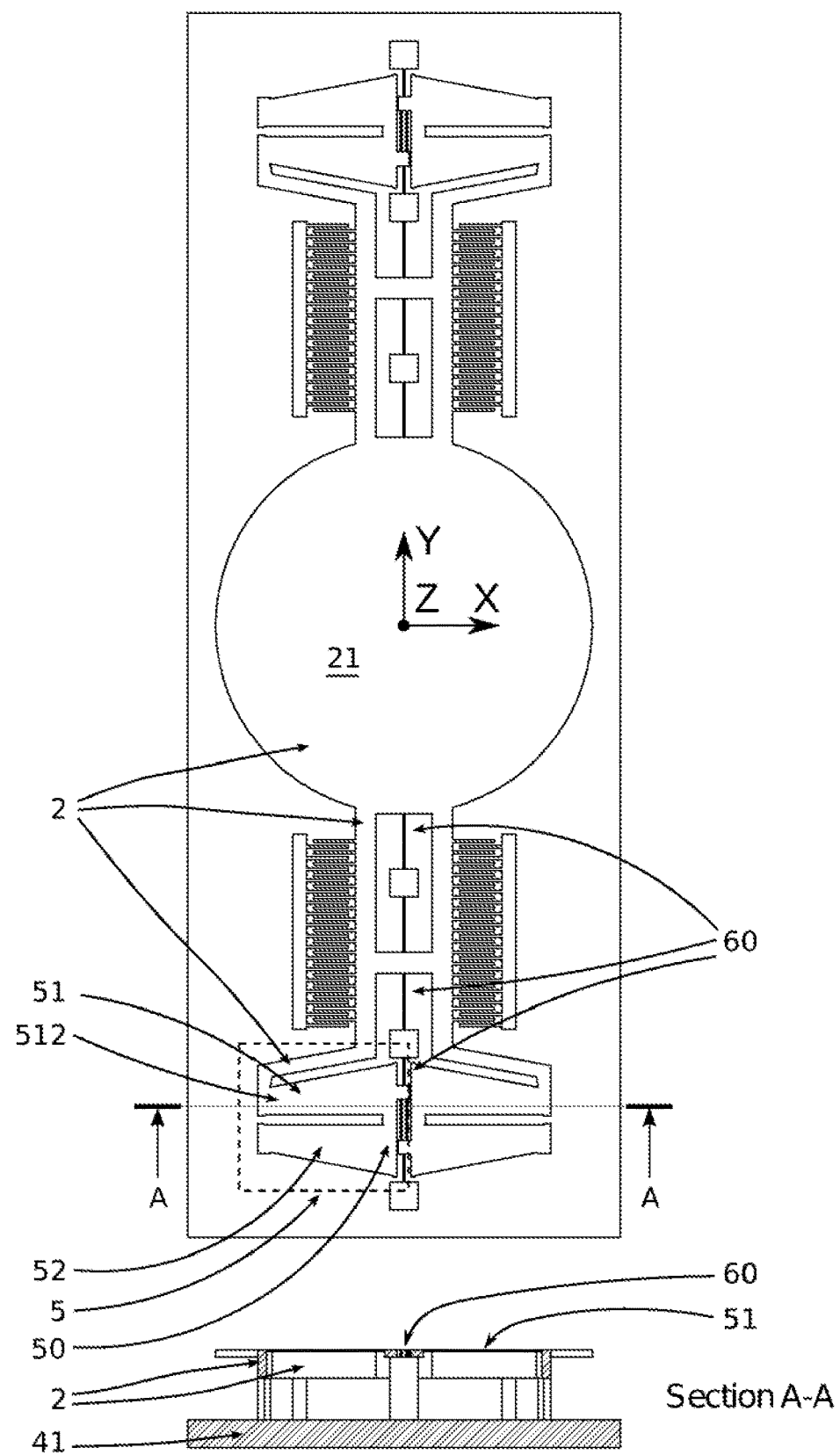
FIG. 2 is a top view and a section view according to section A-A, showing the same embodiment as in FIGS. 1A and 1B.

FIG. 2 is a top view and a section view according to section A-A, showing the MEMS mirror device in a neutral state, in the same embodiment as in FIGS. 1A and 1B. The top view illustrates that the vertical support beam elements 60 have a narrow width in the X-direction, much smaller than their length in Y-direction, in order to limit the mechanical stress occurring in those vertical support beam elements 60 upon rotation of the mirror body 2. Preferably, the width in X-direction is less than 20 micrometer. The length of the vertical support beam elements 60 in Y-direction is typically between 100 and 500 micrometers. The height of the vertical support beam elements 60 in Z-direction should be as large as possible to provide for a high stiffness for translation of the mirror body 2 in the Z-direction, and for rotation of the mirror body 2 around the X-axis. This height is however limited by the mechanical stress occurring in those vertical support beam elements 60 upon rotation of the mirror body 2. Preferably, the height is between 20 and 100 micrometers.

Additionally, it is shown in FIG. 2 that the end 512 of the leaf spring section 51 is connected to the mirror body 2. It is also shown in this embodiment of the MEMS mirror device 1 that the mirror body 2 extends all the way from underneath the mirror surface 21, via the actuator 7, to the coupling element 5.

The thickness of the mirror body 2, measured in the Z-direction, can be observed in the section view A-A. This thickness is much larger than the thickness of the leaf spring sections 51, 52, such that the mirror body 2 is a rigid body. The thickness of the leaf spring sections 51, 52 is typically between 5 and 20 micrometers. The thickness of the mirror body 2 is typically between 20 and 400 micrometers. The thickness of the complete MEMS mirror device 1, as measured in Z-direction from the top of the mirror surface 21 to the bottom of the stationary layer 41, is typically between 300 and 1100 micrometer.

Figure 3:
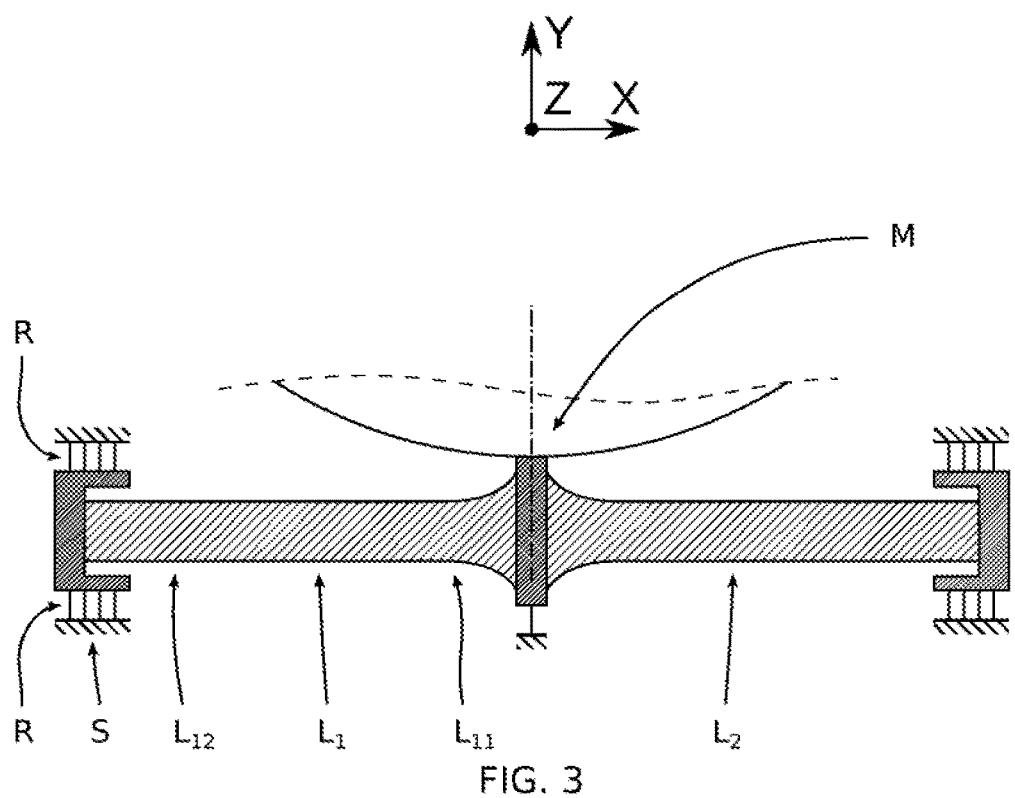
FIG. 3 schematically shows a top view of a leaf spring suspension with relief springs (vertical support beams), as known from the prior art in U.S. Pat. No. 9,588,337B2.

FIG. 3 schematically shows a top view of a leaf spring suspension with relief springs R, as known from the prior art in U.S. Pat. No. 9,588,337B2. It comprises a leaf spring L1, of which a first end L11 is coupled to a mirror body M and of which a second end L12 is coupled to a stationary body S using relief springs R. In this prior art, the relief springs are used to mitigate or tailor the stiffening behavior of the leaf springs L1 and L2 occurring at larger tilt angles. This stiffening is caused by tensile stresses in the leaf spring, which increase with tilt angle, and which are again caused by the elongation of the leaf spring in X-direction. In order for the mitigation to be effective, the relief springs must have a low stiffness in the X-direction. This is however undesirable because this will reduce the overall stiffness of the suspension in X-direction, which will lead to a lower eigenfrequency of the in-plane translation mode Tx. A low eigenfrequency makes the MEMS mirror device more fragile and more sensitive to vibrations in that direction. Using an embodiment as discussed in the prior art will therefore require finding a compromise between on one hand a low amount of stiffening and low tensile stresses, and on the other hand a high eigenfrequency of the Tx mode and a high insensitivity to vibrations.

In the present invention, the leaf springs are connected directly to a stationary body, i.e. without having relief springs in series. This leads to a higher stiffness of the suspension in X-direction, to a higher eigenfrequency of the Tx mode, and hence to a lower sensitivity to vibrations and higher robustness. This is achieved without introducing high tensile stresses and strong stiffening behavior. The aforementioned compromise is no longer required.

Figure 4A:
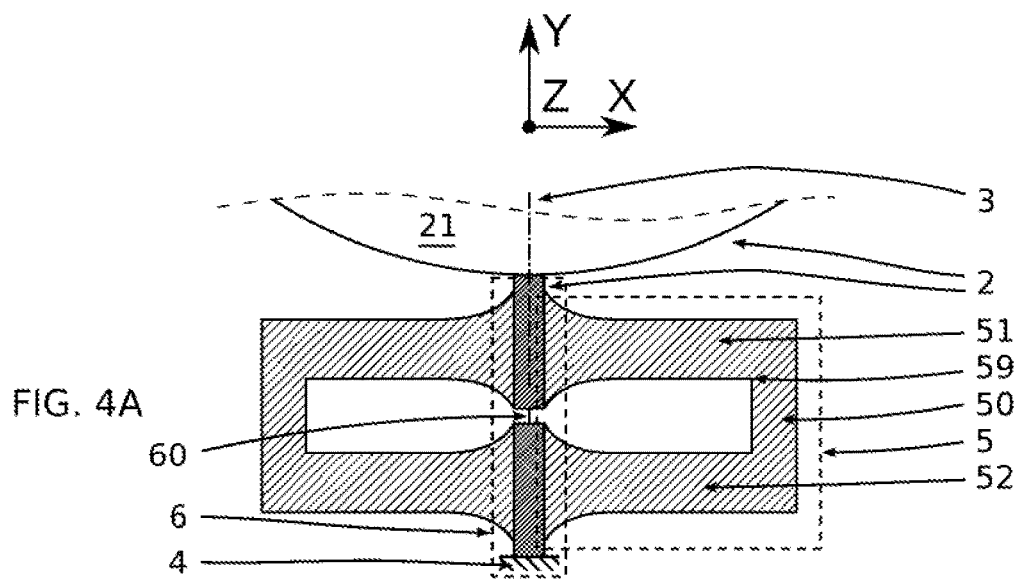
FIGS. 4A-4C schematically show various embodiments of the MEMS mirror as claimed, each having coupling elements comprising a bridge section and two leaf spring sections, with the coupling elements having different geometrical shapes.
Figure 4B:
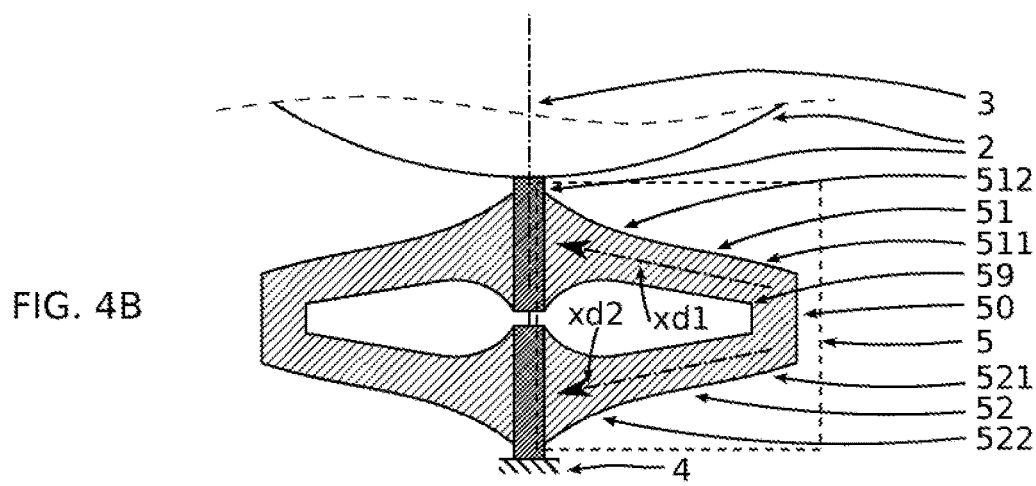
Figure 4C:
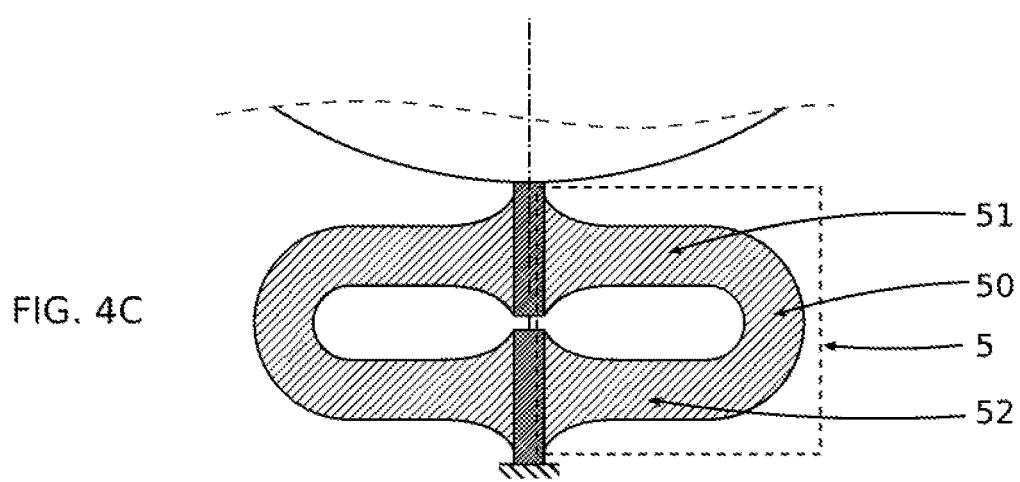

FIGS. 4A-4C schematically show various embodiments of the MEMS mirror as claimed, each having coupling elements 5 comprising a bridge section 50 and two leaf spring sections 51, 52, with the coupling elements 5 having different geometrical shapes. An actuator has not been included in these schematic drawings, and only a small segment of the contour of the mirror surface 21 has been drawn. These embodiments also have at least one vertical support beam unit 6 that enables the mirror body 2 to rotate around a rotation axis 3. The coupling element 5 and the vertical support beam element 6 are coupled to the mirror body 2 as well as to the stationary body 4. The coupling element 5 is coupled such that it can apply a torque between the stationary body 4 and the mirror body 2, around the rotation axis 3. The thickness of the mirror body 2, measured in the Z-direction, is larger than the thickness of the leaf spring sections 51, 52, also measured in Z-direction. The leaf springs sections 51, 52 are therefore relatively compliant when compared to the mirror body 2. The mirror body 2 is a rigid body, having a high stiffness. The difference in thickness is illustrated by the difference in hatching of the parts in FIGS. 4A-4C. The thick parts have a dense hatching pattern, whereas the thin parts have a sparse hatching pattern.

FIG. 4B shows a first leaf spring section 51 and a second leaf spring section 52, the first leaf spring section 51 extending in an extension direction xd1 from a first end 511 thereof at the bridge section 50 towards a second end 512 thereof that is connected to the mirror body 2 and the second leaf spring section 52 extending in an extension direction xd2 from a first end 521 thereof at the bridge section 50 towards a second end 522 thereof where it is connected to the stationary body 4. The extension directions xd1 and xd2 are substantially perpendicular to the rotation axis. Preferably, the extension directions xd1 is symmetric to extension direction xd2, as depicted in FIG. 4B.

Figure 5A:
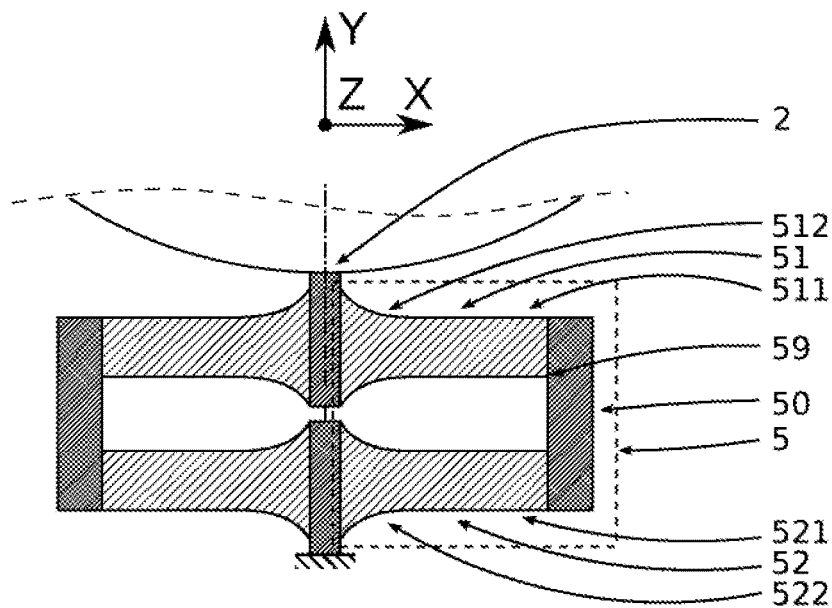
FIGS. 5A-5C schematically show various embodiments of the MEMS mirror as claimed, in which the bridge sections have a larger thickness than the leaf spring sections.
Figure 5B:
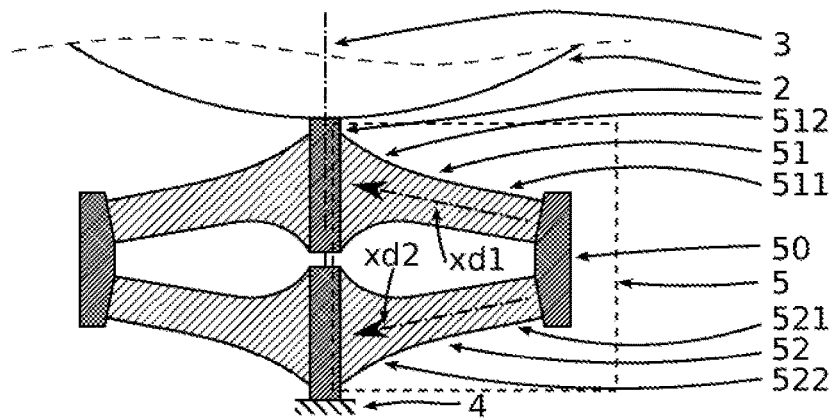
Figure 5C:
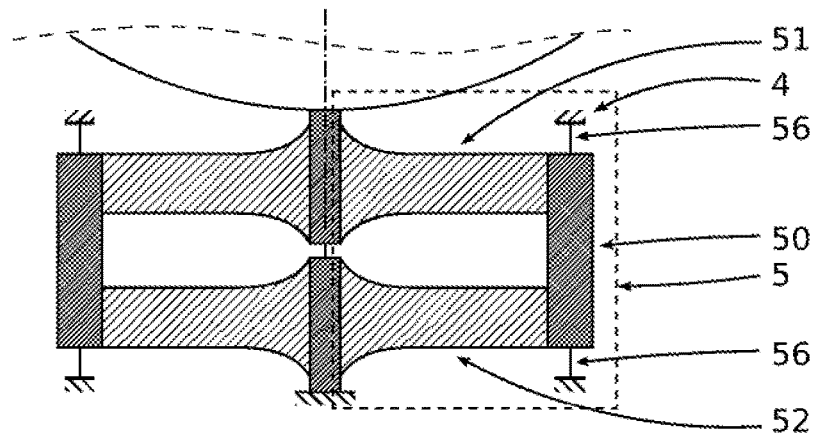
Figure 6A:
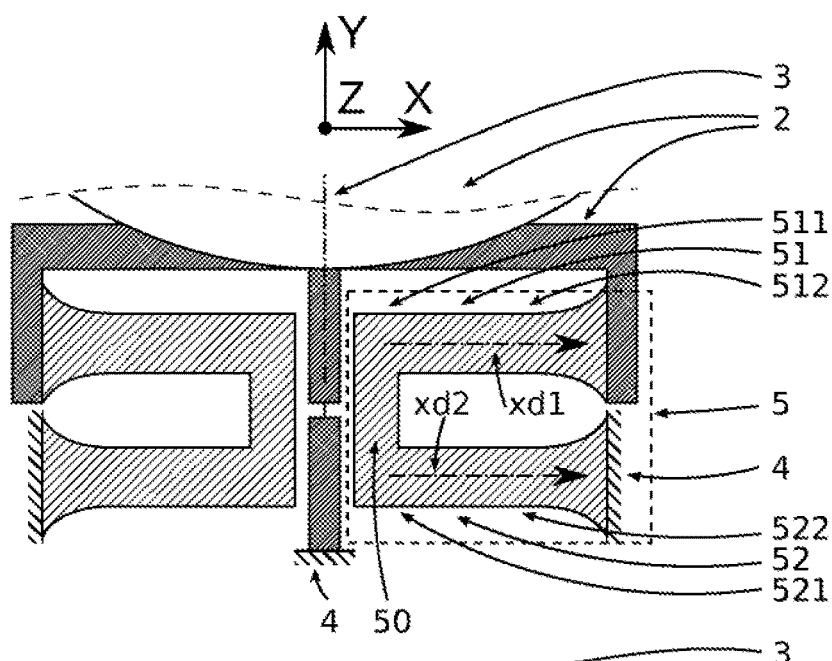
FIGS. 6A-6C schematically show various embodiments of the MEMS mirror as claimed, these embodiments having in common that the bridge section is located spatially close to the rotation axis.
Figure 6B:
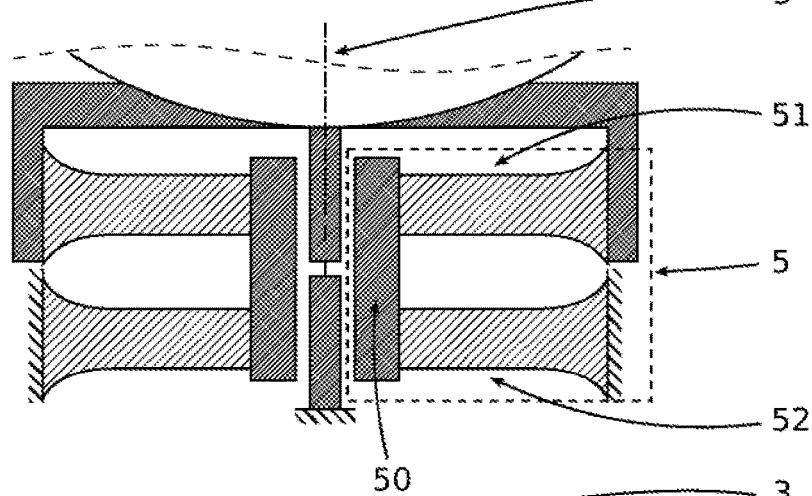
Figure 6C:
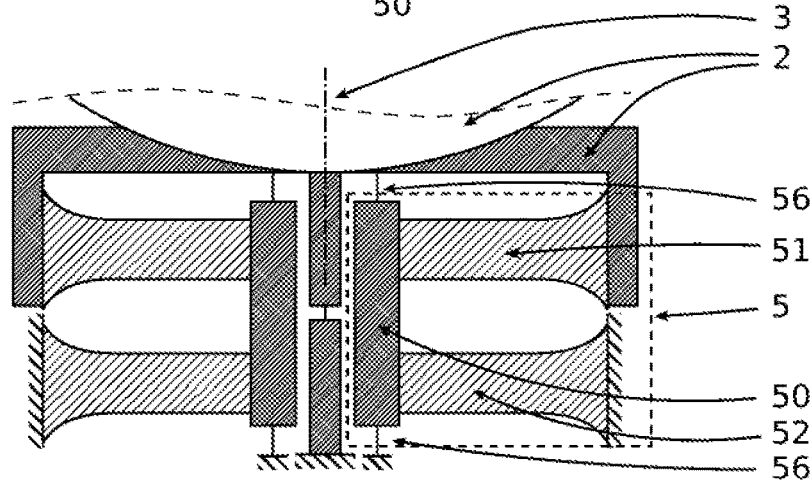

The short side of the first end 511 of the first leaf spring section 51 may be colinear with the short side of the first end 521 of the second leaf spring section 52, as depicted in FIG. 5A. The short side of the first end 511 of the first leaf spring section 51 may have an angle relative to the short side of the first end 521 of the second leaf spring section 52, as depicted in FIG. 5B. Similarly, the short side of the second end 512 of the first leaf spring section 51 may be colinear with the short side of the second end 522 of the second leaf spring section 52, as depicted in FIGS. 5A-5B. The short side of the second end 512 of the first leaf spring section 51 may have an angle relative to the short side of the second end 522 of the second leaf spring section 52. In the embodiment of FIGS. 5A, 5B and 5C, the first and the second leaf spring sections 51, 52 taper outwards in a direction towards their second ends 512, 522 near the rotation axis. Therewith the centerlines of the first and the second leaf spring sections 51, 52 need to be relatively far apart. In the embodiment of FIG. 5B, wherein the first end 511 of the first leaf spring section 51 has an angle relative to the first end 521 of the second leaf spring section 52, the length (and mass) of the bridge section 50 is limited, therewith providing for a higher stiffness, and therewith a higher natural frequency and less deformation of the bridge section The bridge section 50 is defined as the part of the coupling element 5 where the leaf spring sections 51 and 52 are connected to each other. In FIGS. 4A-4C, the bridge section 50 is located away from the rotation axis 3. In that case the second end 512 of the first leaf spring section 51 is spatially closer to the rotation axis 3 than its first end 511. In FIGS. 6A-6C instead, the bridge section 50 is located close to the rotation axis 3.

The length of the bridge section 50, measured in the Y-direction, depends (amongst others) on the direction of the extension directions xd1 and xd2. See for example FIG. 4B, in which the bridge section 50 is relatively short.

In FIG. 4C the bridge section 50 has a rounded shape, and has a larger length. The round shape of the bridge section 50 eliminates the high mechanical stresses that are present in the sharp corners 59 in the embodiments of FIGS. 4A-4B. Upon rotation of the mirror body 2 around the rotation axis 3, two leaf spring sections 51 and 52 belonging to the same coupling element 5 will bend in opposite directions. This will lead to a rotation of the bridge section 50 around the X-axis, and to twisting of the leaf spring sections 51 and 52 around the X-axis. This rotation and twisting will lead to high mechanical stresses on the inside of the coupling element, especially at sharp internal corners 59.

The width of the leaf spring sections 51, 52, as measured in the Y-direction, may vary along its extension direction xd1 or xd2. For example, a tapering may be present at one of the ends 512 and 522 of the leaf spring sections 51 and 52, as depicted in FIG. 4B. A tapering is defined as a gradually increasing width towards the ends of the leaf spring sections. Similarly, a tapering may be present at the ends 511 and 521.

In FIGS. 5A-5C, the bridge section has a larger thickness (measured in Z-direction) than the leaf spring sections. The difference in thickness is illustrated by the difference in hatching of the parts in FIGS. 5A-5C. The thick parts have a dense hatching pattern, whereas the thin parts have a sparse hatching pattern. Using a thicker bridge section 50 reduces the deformation thereof, which leads to a more uniform loading of the leaf spring sections 51, 52. Specifically, the mechanical stresses at sharp internal corners 59 are reduced, which makes the coupling element 5 more robust and which allows for larger tilting angles of the mirror body 2. The thickness of the bridge section 50 is typically between 20 and 400 micrometers.

Preferably, a distance between the first end 511 of the first leaf spring section 51 and the rotation axis 3 is substantially the same as a distance between the first end 521 of the second leaf spring section 52 and the rotation axis, and a distance between the second end 512 of the first leaf spring section 51 to the rotation axis 3 is substantially the same as a distance between the second end 522 of the second leaf spring section 52 to the rotation axis. In such an embodiment the deformation and the stress distribution on the leaf spring sections 51 and 52 are similar, twisting of the leaf spring sections 51, 52 around the X-axis is minimized, and the loading is most uniform. This makes the coupling element 5 more robust and allows for large tilt angles of the mirror body 2 around the rotation axis 3.

The coupling elements 50 as depicted in FIGS. 5A-5B have their own eigenmode, apart from the eigenmodes from the mirror body 2. This eigenmode exists because the bridge section 50 has a mass and because it can move in Z-direction. The corresponding stiffness in Z-direction is that of the two leaf spring sections 51, 52. The eigenfrequency of the coupling element 50 is approximately calculated as the square root of the ratio of the total stiffness of the two leaf spring sections 51, 52 in Z-direction over the mass of bridge section 50. Increasing the thickness of the bridge sections 50 increases its mass and therefore reduces the eigenfrequency, which is undesirable. In the embodiment of FIG. 5C, the translation of the bridge sections has been constrained by vertical support beams 56. These support beams 56 have a relatively high stiffness in Z-direction, effectively suppressing the translation in Z-direction. The stiffness in the other DOFs, such as translation in the X-direction and rotation around the Y-axis, is relatively low. The stiffness in X-direction should be as low as possible, to avoid introducing stiffening behavior upon bending of the leaf spring sections, and to avoid introducing mechanical stresses. This is possible because the vertical support beams 56 do not need to contribute to the stiffness of the coupling elements in the X-direction. This stiffness is already relatively high inherently due to the construction of the coupling element 5 using the leaf spring sections 51, 52 and the bridge element 50. This is because the leaf spring sections 51, 52, are connected directly to the mirror body 2 and the stationary body 4, without using any elastic connection such as relief springs in series or in between.

FIG. 5B shows a first leaf spring section 51 and a second leaf spring section 52. The first leaf spring section 51 extends in an extension direction xd1 from a first end 511 thereof at the bridge section 50 towards a second end 512 thereof that is connected to the mirror body 2. The second leaf spring section 52 extends in an extension direction xd2 from a first end 521 thereof at the bridge section 50 towards a second end 522 thereof where it is connected to the stationary body 4.

If two or more vertical support beams 56 are used at different Y-coordinates, for example one vertical support beam 56 at each side of the bridge section 50 as depicted in FIG. 5C, then additionally the rotation of the bridge section 50 around the X-axis is suppressed. This increases the eigenfrequency of the corresponding rotational eigenmode. Additionally, it reduces the twisting of the leaf spring sections 51, 52 that would otherwise occur upon rotation of the bridge section 50 around the X-axis, and it therefore leads to a more uniform mechanical stress distribution in the leaf spring sections 51, 52. Stress concentrations are avoided, and larger tilt angles of the mirror body 2 can be realized.

Upon rotation of the mirror body 2 around the rotation axis 3, the leaf spring sections 51, 52 will bend. The ends 511 and 521 of the leaf spring sections will move in Z-direction and rotate around the rotation axis 3 too. The bridge section 50 will follow the movement and rotation of the ends 511, 521 of the leaf spring sections 51 and 52. The angle of rotation of the bridge section 50 around the Y-axis will be approximately half of the angle of rotation of the mirror body 2 around the Y-axis. The amount of translation of the bridge section 50 in the Z-direction depends on the rotation angle of the mirror body 2, and on the distance from the bridge section 50 to the rotation axis 3. The larger the distance from the bridge section 50 to the rotation axis 3, the larger the translation of the bridge section 50 in the Z-direction. This translation in the Z-direction, which is inevitable and inherent to the rotation of the mirror body 2, makes it difficult to constrain the translation in the Z-direction to suppress the eigenmode of the coupling element 50. If the bridge section 50 is located close to the rotation axis 3, then the translation of the bridge section 50 in Z-direction upon rotation of the mirror body 2 around the rotation axis 3 will be relatively small. This makes it easier to constrain the translation of the bridge section 50 in Z-direction in order to increase the eigenfrequency of the coupling element 5.

FIGS. 6A-6C schematically show various other embodiments of the MEMS mirror as claimed. These other embodiments have in common that the bridge section 50 is located close to the rotation axis 3. FIG. 6A shows a first leaf spring section 51 and a second leaf spring section 52, the first leaf spring section 51 extending in an extension direction xd1 from a first end 511 thereof at the bridge section 50 towards a second end 512 thereof that is connected to the mirror body 2 and a second leaf spring section 52 extending in an extension direction xd2 from a first end 521 thereof at the bridge section 50 towards a second end 522 thereof where it is connected to the stationary body 4. The extension directions xd1 and xd2 are substantially perpendicular to the rotation axis. In FIG. 6A-6C, the first end 511 of the first leaf spring section 51 is spatially closer to the rotation axis 3 than its second end 512.

The embodiment shown in FIG. 6B is similar to that in FIG. 6A, with the only difference that the thickness of the bridge section 50 measured in Z-direction is larger than the thickness of the leaf spring sections 51, 52 measured in the Z-direction. The thickness of the bridge section 50 is typically between 20 and 400 micrometers. A larger thickness of the bridge section 50 leads to a large mass of the bridge section 50, which again leads to a lower eigenfrequency of the coupling element 50. The embodiment in FIG. 6C comprises vertical support beams 56 which connect the bridge section 50 to a stationary body 4 and to the mirror body 2. This increases the stiffness relevant for the translation of the bridge section 50 in the Z-direction, and this therefore leads to a higher eigenfrequency of the coupling element 5. This again results in a higher insensitivity to vibrations and higher accuracy of the MEMS mirror device 1. The vertical support beams 56 only need to provide a high stiffness in the Z-direction. The stiffness for translations in X-direction and rotations around the Y-axis should be as low as possible to prevent high mechanical stresses and to avoid introducing stiffening behavior in the coupling element 5. In a different embodiment, all vertical support beams 56 are connected to the stationary body 4, optionally using poles connecting to a stationary layer underneath the MEMS mirror body 5. In yet another embodiment, all vertical support beams 56 are connected to the mirror body 2.

FIGS. 7A-7C schematically show various embodiments of the MEMS mirror as claimed, in which the bridge sections 50 and 50' of two coupling elements 5 and 5' are connected to each other by an elastic connection, such as vertical support beams 56, optionally through a rigid intermediate body 55. In FIG. 7A, the bridge sections 50 and 50' of two coupling elements 5 and 5', located at opposite sides of the rotation axis 3, are flexibly connected to each other using vertical support beams 56. Upon rotation of the mirror body 2 around the rotation axis 3, the bridge sections 50 and 50' will tend to rotate around the X-axis. This is due to the different sign of the forces in Z-direction acting upon the ends of the leaf spring sections 511 and 521. If end 511 moves by some amount in Z-direction, then end 521 will move by a different amount in Z-direction. This leads to the aforementioned rotation of the bridge sections 50 and 50' around the X-axis. The sign of this rotation around the X-axis is however different for the two bridge sections 50 and 50'. Therefore, the rotation can be suppressed by connecting the bridge sections 50 and 50' of two opposing coupling elements 5 and 5' to each other, in such a way that a high stiffness is introduced in Z-direction, preventing this rotation around the X-axis. This can be achieved by using one or more vertical support beams 56 to connect the bridge sections 50 and 50' to each other. Preferably two or more vertical support beams 56 are used, spatially separated in the Y-direction. In other words, at least one vertical support beam 56 is located close to the mirror body 2, whereas another vertical support beam 56 is located further away from the mirror body 2 in Y-direction. In the embodiment of FIG. 7A additional vertical support beams 56 are used to flexibly connect the bridge sections 50 and 50' to the stationary body 4 and to the mirror body 2, in order to increase the eigenfrequency of both coupling elements 5 and 5'. The vertical support beams are required to provide a relatively high stiffness against translation in the Z-direction, whereas their stiffness in the other DOFs is preferably as low as possible.

In the embodiments of FIGS. 7B-7C an intermediate rigid body 55 is used to connect the bridge sections 50 and 50' of two opposing coupling elements 5 and 5' to each other. The rigid intermediate body 55 is again connected to at least one of a stationary body 4 and the mirror body 2. In FIG. 7B the rigid intermediate body 55 is connected on one side to the stationary body 4 using vertical support beam 56, and on the other side to the mirror body 2, also using a vertical support beam 56. In FIG. 7C the rigid intermediate body 55 is connected on two sides to the stationary body 4 using vertical support beams 56. The mirror body 2 is also connected to the stationary body 4 using a vertical support beam 56. In these embodiments from FIGS. 7B-7C, more space is available in between the bridge sections 50 and 50' of the coupling elements 5 and 5' to create a connection from the intermediate body 55 to a stationary body 4 or the mirror body 2. Another advantage of this embodiment is that the suspension can be designed to be more compact in the Y-direction, leading to a smaller overall size of the MEMS mirror device.

Figure 8:
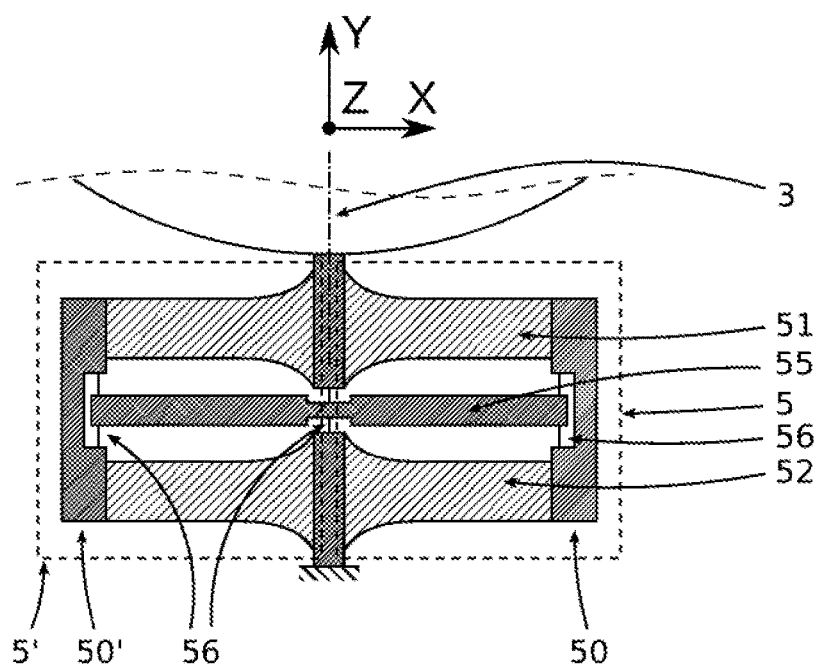
FIG. 8 schematically shows an embodiment of the MEMS mirror as claimed, in which the bridge sections are coupled to each other by an elastic coupling and a rigid intermediate body, in which the bridge sections are located remote from the rotation axis.

FIG. 8 schematically shows an embodiment of the MEMS mirror device 1 as claimed, in which the bridge sections 50 and 50' are coupled to each other by an elastic coupling, such as a vertical support beam 56, through a rigid intermediate body 55. Contrary to the embodiment in FIG. 7B, in this embodiment the bridge sections 50 and 50' are located away from the rotation axis 3. This embodiment is effective in reducing the rotation of the bridge sections 50 and 50' around the X-axis, and therefore reduces the twisting of the leaf spring sections 51 and 52 around the X-axis. This embodiment is also effective in increasing the eigenfrequency or the eigenmode of the coupling elements 5 and 5', although not as effective as the embodiments in FIGS. 7A-7C.

Figure 9A:
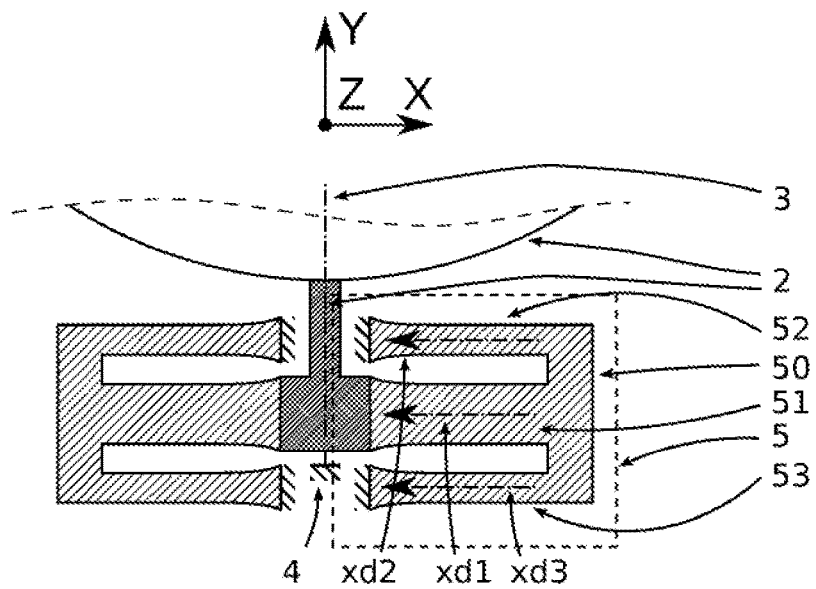
FIGS. 9A-9B schematically show embodiments of the MEMS mirror as claimed, in which the coupling elements comprise a larger plurality of leaf spring sections, with the bridge sections located remote from the rotation axis.
Figure 9B:
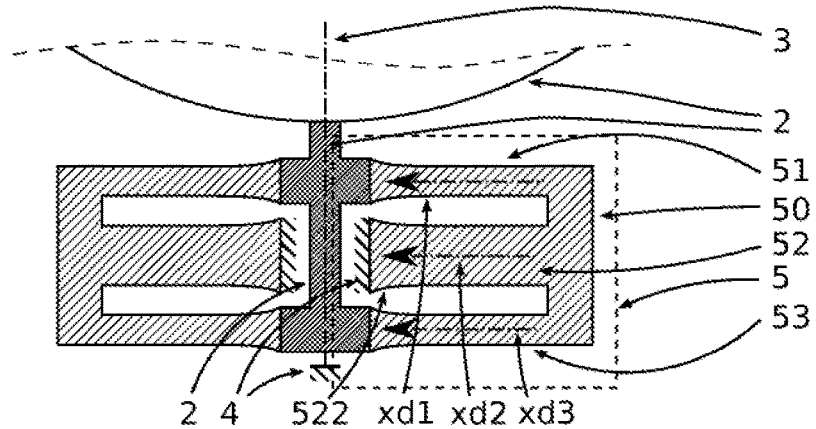

FIGS. 9A-9B schematically show embodiments of the MEMS mirror device as claimed, in which the coupling elements 5 comprise a larger plurality of leaf spring sections 51, 52, 53, with the bridge sections 50 and 50' located away from the rotation axis 3. The leaf spring sections of said larger plurality each extend in an extension direction xd1, xd2, xd3, from a first end thereof at the bridge section 50 towards a second end thereof at either the mirror body 2 or the stationary body 4. In these embodiments the leaf spring sections 51, 52, 53 of the larger plurality of leaf spring sections 51, 52, 53 are arranged side by side. The total width in Y-direction of leaf spring sections of said larger plurality coupled at their second end to the mirror body is at least substantially equal to a total width of leaf spring sections of said larger plurality coupled at their second end to the stationary body. Preferably, in the direction of the rotation axis, leaf spring sections connected to the mirror body are alternated by leaf spring sections connected to the stationary body.

In FIG. 9A, the central leaf spring section 51 is connected to the mirror body 2. In FIG. 9B, the central leaf spring section 52 is connected to a stationary body 4. The second end 522 of leaf spring section 52 connected to the stationary body 4 is fully enclosed by the mirror body 2 and by the leaf spring sections 51 and 53 connected to the mirror body 2. In this embodiment the second end 522 of leaf spring section 52 can therefore not easily be connected to a frame. Preferably, it is connected to a stationary layer underneath the mirror body 2 using a pole.

In the embodiments of FIGS. 9A-9B and FIGS. 10A-10B, a net torque (around the X-axis) on the bridge sections 50 and 50' is substantially reduced. I.e. in operation the rotation of the bridge sections 50 and 50' around the X-axis will be substantially reduced, and therefore the leaf spring sections 51, 52, 53 will be subject to less twisting. Therewith a more pure bending of the leaf spring sections 51, 52, 53 is remaining, and the mechanical stress is more uniform and substantially reduced. As opposed to the embodiments from FIGS. 7B, 7C and 8, no intermediate body needs to be used to this end.

In a practical example of these embodiments having larger plurality of leaf spring sections, the larger plurality of leaf spring sections comprises a third leaf spring section and a width measured in Y-direction of a centrally arranged one of the first, the second and the third leaf spring section is equal to the sum of the widths of the other two of said leaf spring sections. Referring for example to FIG. 9A, the width of the leaf spring section 51 is equal to the sum of the widths of leaf spring section 52 and 53.

Figure 10A:
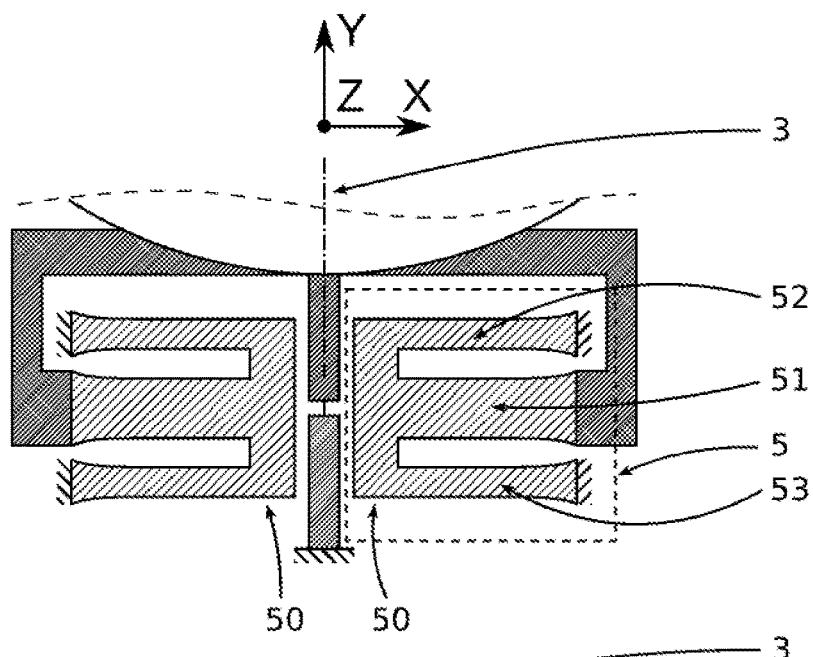
FIGS. 10A-10B are similar to FIGS. 9A-9B, except for the bridge sections being located spatially close to the rotation axis in FIGS. 10A-10B
Figure 10B:
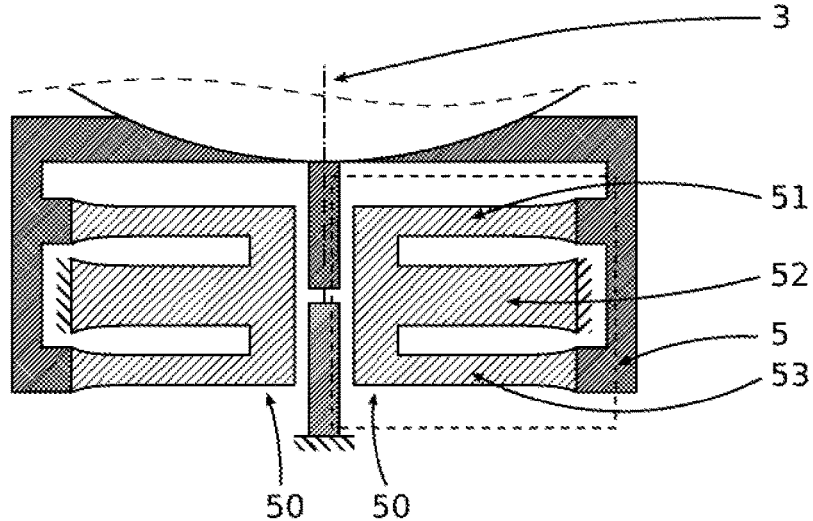

FIGS. 10A-10B show other embodiments having larger plurality of leaf spring sections, with the bridge sections 50 and 50' located close to the rotation axis 3. In other embodiments, the bridge sections 50 and 50' have a larger thickness measured in the Z-direction than the thickness of the leaf spring sections measured in Z-direction. In yet other embodiments, the translation of the bridge sections 50 and 50' is constrained by vertical support beams, which is more easily realized if the bridge section is located close to the rotation axis 3.

The invention claimed is:

1. A scanning MEMS mirror device comprising a mirror body that is rotatable around a rotation axis with respect to a stationary body, wherein a rotation of the mirror body is flexibly restrained with at least one coupling element that biases the mirror body towards a neutral state wherein a mirror surface of the mirror body is parallel with a reference plane with a first planar direction defined by the rotation axis and a second planar direction orthogonal thereto, the coupling element comprising at least a bridge section and a first leaf spring section and a second leaf spring section, the first leaf spring section extending in an extension direction from a first end of the first leaf spring section at the bridge section towards a second end of the first leaf spring section that is connected to the mirror body and the second leaf spring section extending in an extension direction from a first end of the second leaf spring section at the bridge section towards a second end of the second leaf spring section that is connected to the stationary, the extension direction of the first leaf spring section and the extension direction of the second leaf spring section being at least substantially the same as the second planar direction, the first and the second leaf spring section having a thickness defined in a direction orthogonal to the reference plane and having a width defined in said first planar direction, the thickness being smaller than the width.

2. The scanning MEMS-mirror device according to claim 1, further comprising a vertical support beam unit extending at least substantially along the rotation axis, the vertical support beam unit having a first end connected to the mirror body and having a second end connected to the stationary body, the vertical support beam unit having one or more vertical support beam elements.

3. The scanning MEMS-mirror device according to claim 1, wherein the stationary body has a stationary layer in a plane positioned with respect to the mirror surface in a stationary state in a direction opposite to a facing direction of the mirror surface in the stationary state, the stationary layer having a pole extending in the facing direction to which the second end of the second leaf spring section is connected.

4. The scanning MEMS-mirror device according to claim 1, wherein the second end of the first leaf spring section is spatially closer to the rotation axis than the first end of the first leaf spring section.

5. The scanning MEMS-mirror device according to claim 1, wherein the first end of the first leaf spring section is spatially closer to the rotation axis than the second end of the first leaf spring section.

6. The scanning MEMS-mirror device according to claim 1, wherein a distance between the first end of the first leaf spring section and the rotation axis is substantially the same as a distance between the first end of the second leaf spring section and the rotation axis, and wherein a distance between the second end of the first leaf spring section and the rotation axis is substantially the same as a distance between the second end of the second leaf spring section and the rotation axis.

7. The scanning MEMS-mirror device according to claim 1, wherein the first and the second leaf spring section are two of a larger plurality of leaf spring sections of said at least one coupling element, the leaf spring sections of said larger plurality each extending in an extension direction from a first end thereof at the bridge section towards a second end thereof at one of the mirror body and the stationary body, wherein the leaf spring sections of said larger plurality of leaf spring sections are arranged side by side in a direction parallel to the first planar direction wherein a total width of leaf spring sections of said larger plurality coupled at their second end to the mirror body is at least substantially equal to a total width of leaf spring sections of said larger plurality coupled at their second end to the stationary body and wherein optionally leaf spring sections coupled at their second end to the mirror body are alternated by leaf spring sections coupled at their second end to the stationary body.

8. The scanning MEMS-mirror device according to claim 7, wherein the larger plurality of leaf spring sections comprises a third leaf spring section and wherein a width of a centrally arranged one of the first, the second and the third leaf spring section is equal to the sum of the widths of the other two of said leaf spring sections.

9. The scanning MEMS-mirror device according to claim 1, wherein the bridge section and the leaf spring sections are integrally formed of a plate of material.

10. The scanning MEMS-mirror device according to claim 1, wherein the bridge section has a thickness that is larger than the thickness of the leaf spring sections.

11. The scanning MEMS-mirror device according to claim 1, wherein the bridge section of the at least one coupling element is flexibly coupled, optionally by an elastic connection, to one of the mirror body or to the stationary body.

12. The scanning MEMS-mirror device according to claim 1, wherein the bridge section of the at least one coupling element is flexibly coupled, optionally by an elastic connection, to a bridge section of another coupling element.

13. The scanning MEMS-mirror device according to claim 12, wherein the bridge section of the at least one coupling element is flexibly coupled to the bridge section of the another coupling element via an intermediate rigid element.

14. The scanning MEMS-mirror device according to claim 13, wherein the intermediate rigid element is rotatably coupled to the mirror body and/or to the stationary body by at least one vertical support beam element.

15. The scanning MEMS-mirror device according to claim 14, wherein the first end of the first leaf spring section is spatially closer to the rotation axis than the second end of the first leaf spring section and wherein each of the bridge sections is mechanically coupled to the intermediate rigid body with a plurality of resilient elements at mutually different distances from the rotation axis.

16. The scanning MEMS-mirror device according to claim 2, wherein the stationary body has a stationary layer in a plane positioned with respect to the mirror surface in a stationary state in a direction opposite to a facing direction of the mirror surface in the stationary state, the stationary layer having a pole extending in the facing direction to which the second end of the second leaf spring section is connected.

17. The scanning MEMS-mirror device according to claim 2, wherein the second end of the first leaf spring section is spatially closer to the rotation axis than the first end of the first leaf spring section.

18. The scanning MEMS-mirror device according to claim 3, wherein the second end of the first leaf spring section is spatially closer to the rotation axis than the first end of the first leaf spring section.

19. The scanning MEMS-mirror device according to claim 2, wherein the first end of the first leaf spring section is spatially closer to the rotation axis than the second end of the first leaf spring section.

20. The scanning MEMS-mirror device according to claim 3, wherein the first end of the first leaf spring section is spatially closer to the rotation axis than the second end of the first leaf spring section.

* * * * *